(12) United States Patent
Stone et al.

(10) Patent No.: US 6,614,941 B1
(45) Date of Patent: Sep. 2, 2003

(54) IMAGE ACTIVITY IN VIDEO COMPRESSION

(75) Inventors: Jonathan James Stone, Reading (GB); Clive Henry Gillard, Basingstoke (GB)

(73) Assignees: Sony Corporation, Tokyo (JP); Sony United Kingdom Limited, Weybridge (GB)

( * ) Notice: Subject to any disclaimer, the term of this patent is extended or adjusted under 35 U.S.C. 154(b) by 0 days.

(21) Appl. No.: 08/721,623

(22) Filed: Sep. 26, 1996

(30) Foreign Application Priority Data

Oct. 30, 1995 (GB) ............................... 9522171

(51) Int. Cl.[7] .............................. G06K 9/36; G06K 9/46
(52) U.S. Cl. ....................................... 382/251; 382/239
(58) Field of Search ................................ 382/239, 251, 382/232, 250; 358/426, 427, 433, 261.2, 261.3, 430, 432; 348/390, 403, 419, 420

(56) References Cited

U.S. PATENT DOCUMENTS

| 5,101,280 A | 3/1992 | Moronaga et al. ........... 358/426 |
| 5,253,075 A | * 10/1993 | Sugiyama ................. 358/261.2 |
| 5,323,187 A | 6/1994 | Park ........................... 348/405 |
| 5,543,848 A | * 8/1996 | Murakami et al. .......... 348/416 |

FOREIGN PATENT DOCUMENTS

| EP | 0 479 510 | 4/1992 |
| EP | 0535960 A2 | 4/1993 |
| EP | 0576763 A1 | 1/1994 |
| WO | WO 92/09173 A1 | 5/1992 |
| WO | WO 93/19434 A1 | 9/1993 |

OTHER PUBLICATIONS

J.C.Russ "The Image Processing Handbook", 2nd edition, CRC, Press, pp. 165–166, 1995.*

* cited by examiner

Primary Examiner—Phuoc Tran
(74) Attorney, Agent, or Firm—Frommer Lawrence & Haug LLP; William S. Frommer

(57) ABSTRACT

Video data compression apparatus comprises means for detecting image activity values indicative of image activity for regions of an input image to be compressed; means for filtering the detected image activity values to reduce the variation in image activity values between groups of adjacent regions of the image; and means for compressing the regions of the image by a degree of data compression dependent on the image activity value for each region.

5 Claims, 4 Drawing Sheets

IMAGE ACTIVITY IN VIDEO COMPRESSION

BACKGROUND OF THE INVENTION

1. Field of the Invention

This invention relates to image activity in video compression.

2. Description of the Prior Art

In some previously proposed video compression systems, the image "activity" is measured for blocks or regions of input images to be encoded. The activity values associated with the blocks are used to allocate available space in the compressed data stream, and therefore to control the degree of compression applied to each of the blocks.

The reason for the variation of the compression in dependence on the activity values is that compression artifacts and distortions are more subjectively disturbing in blocks of low activity or low detail content (such as a plain sky or background area) than in blocks of high detail content (such as an image of a tree or a rough surface). Broadly, then, the image activity measures the degree of detail within a block or region of the image. A highly detailed block will have a high image activity, and a block of low detail will have a low image activity.

In previously proposed video compression systems using the discrete cosine transform technique (DCT), blocks of pixels are frequency separated using the DCT process and each block is then subject to data quantisation with a dependence of the quantisation scale factor on the image activity of that block. In a DCT-based system, each image block is self-contained, so the degree of quantisation applied to one image block does not tend to affect the coding of an adjacent image block.

In contrast, in systems using for example the so-called wavelet encoding technique, the effects of a particular block of wavelet coefficients spread over surrounding blocks of image pixels when the image is subsequently reconstructed. This means that if there are sharp changes in the quantisation level applied to adjacent blocks of wavelet coefficients (resulting from sharp changes in the image activity of pixel blocks at corresponding positions in the original image), there can be visible artifacts generated when the images are decompressed. This can be a particular problem when a block falls at the edge of a region of high activity.

SUMMARY OF THE INVENTION

This invention provides a video data compression apparatus comprising:

means for detecting image activity values indicative of image activity for regions of an input image to be compressed;

means for filtering the detected image activity values to reduce the variation in image activity values between groups of adjacent regions of the image; and means for compressing the regions of the image by a degree of data compression dependent on the image activity value for each region.

The invention addresses the above problem by filtering the detected activity values to avoid or at least alleviate problems of sharp changes in activity values between adjacent regions (e.g. blocks) resulting in sharp changes in the quantisation or compression of those regions of the input image.

Preferably the detecting means is operable to detect the variance of luminance values of pixels in each region of the image.

Preferably the regions comprise rectangular blocks of pixels of the input image.

Although the filtering means could be a multi-tap spatial filter, it is preferred that the filtering means is a simpler (and less processor-intensive) median filter operable to replace the activity value of each regions by the median activity value from a predetermined group of surrounding regions.

As described in the introduction, the problems of sharp changes in activity values resulting in sharp changes in image quantisation apply in particular to wavelet encoded data, and so the invention is particularly applicable to apparatus in which the frequency separating means is a wavelet frequency separator.

Preferably the compressing means comprises: means for frequency separating the regions of the input image to generate respective frequency separated image data; and means for quantising the frequency separated image data derived from each region by a quantisation scale factor dependent on the image activity value for that region.

To avoid any doubt, in the description of a preferred embodiment below, a numerically lower quantisation scale factor will lead to a harsher quantisation and so to a smaller amount of encoded data being generated. This is in fact the opposite convention to that normally quoted in MPEG literature, in which a numerically higher quantisation scale factor will lead to a harsher quantisation. The skilled man will appreciate that in either case the definition is simply a convenient convention and does not affect the function or detail of the present invention.

Preferably the apparatus comprises a multi-stage auto-quantiser for generating quantisation values for use in quantisation of the input image, each stage of the auto-quantiser other than a final stage being operable:

(i) to generate a test quantisation value in dependence on a basic quantisation value and the activity value for a current region;

(ii) to compress frequency separated image data from the current region in accordance with the test quantisation value;

(iii) to compare the resulting quantity of compressed data with a desired quantity of data; and (iv) to increase or decrease the basic quantisation value to be used by a next stage in dependence on whether the quantity of compressed data is greater than or less than the desired quantity.

Preferably the test quantisation values are generated by the following formula:

$$qs = \frac{2 \cdot AQSF}{1 + \frac{A}{P}}$$

where AQSF is a "basic" quantisation value, A is an activity value, and P is a scaling constant. A feature of this function is that where the overall quantisation of the image is relatively gentle, then there is a wide variation in quantisation in dependence on the block activity values. However, where the overall quantisation of the image is harsh, then there is little variation between blocks in dependence on their activity values. The reason for the low variation between blocks at a harsh overall quantisation level is that the blocks of high activity are already harshly quantised and so there is little scope for quantising those blocks yet more harshly.

Although a quantisation value can be calculated for each region or block of the image from which an activity value is detected, it can be more convenient that a single quantisation factor is used in quantising frequency separated image data derived from a plurality of regions (e.g. a horizontal "slice" of the image), the single quantisation scale factor being dependent on the image activity values detected for at least one of the plurality of regions.

This invention also provides apparatus for generating quantisation values for use in quantisation of regions of an input image, the apparatus comprising a plurality of stages, each stage of the apparatus other than the final stage being operable:

(i) to generate a test quantisation value in dependence on a basic quantisation value and an activity value indicative of a degree of detail in a current region;

(ii) to compress frequency separated image data from the current region in accordance with the test quantisation value;

(iii) to compare the resulting quantity of compressed data with a desired quantity of data; and (iv) to increase or decrease the basic quantisation value to be used by a next stage in dependence on whether the quantity of compressed data is greater than or less than the desired quantity;

the final stage being operable to generate a final quantisation value for use in quantising the image data for the current region in dependence on the basic quantisation value and the activity value indicative of a degree of detail in the current region.

This invention also provides a video data compression method comprising the steps of:

detecting image activity values indicative of image activity for regions of an input image to be compressed;

filtering the detected image activity values to reduce the variation in image activity values between groups of adjacent regions of the image; and compressing the regions of the image by a degree of data compression dependent on the image activity value for each region.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
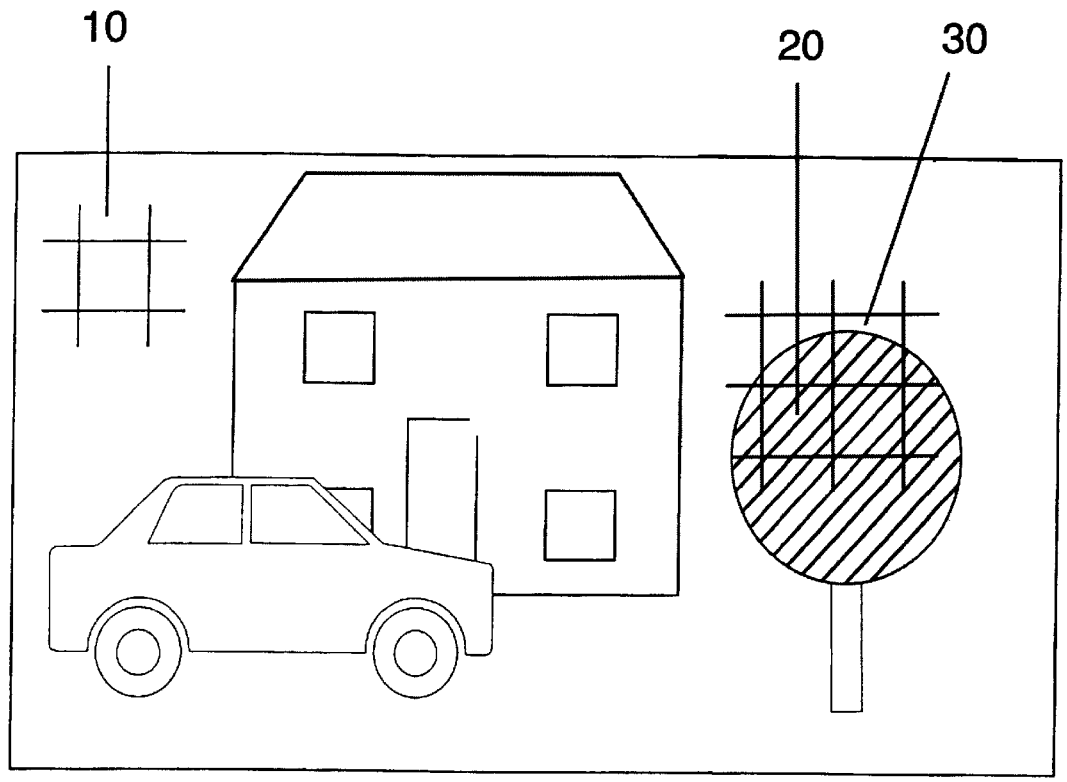
FIG. 1 is a schematic diagram of a video picture illustrating different levels of image activity.

FIG. 1 is a schematic diagram of a video picture illustrating different levels of image activity.

The "activity" of a block of a picture is a measure of the degree of detail in that block. This means that a block representing a plain, bland area of the picture, such as an area of sky 10 in FIG. 1 has a low image activity. A block which includes a great deal of image detail such as an area 20 of the tree in FIG. 1, has a high activity. FIG. 1 also illustrates an intermediate area 30 at the edge of the tree, which has an activity value between that of the block 10 and that of the block 20.

The justification for measuring image activity is that available space in a compressed video data stream can be allocated block-by-block (or by groups of blocks) depending on the measured activity. In other words, the degree of data compression applied to each block or group of blocks is varied depending on the activity measured for that block or group of blocks.

The degree of compression can be varied in dependence on the activity values because it has been observed that compression artifacts and distortions are more subjectively disturbing in blocks of low detail content (low activity, such as the plain sky area 10) than in blocks of high detail content (high activity, such as the block 20 of the tree in FIG. 1). This is because the high level of detail in a block of high activity tends to distract the eye from the compression artifacts or distortions.

Figure 2:
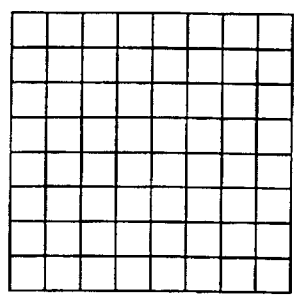
FIG. 2 is a schematic diagram of a block of pixels of the picture of Figure 1.

FIG. 2 is a schematic diagram of a block of 8×8 pixels of an image. The activity of the block of FIG. 2 can be measured by determining the variance ($\sigma^2$) of the luminance values of the pixels in the block. The block activity is then derived by dividing the luminance variance for each block by the mean of variances for all of the blocks in the image (or groups of blocks forming sub-areas of the image such as stripes). This yields a normalised block activity value:

$$\text{block activity} = \text{block}\sigma^2/\text{mean}(\sigma^2)$$

Figure 3:
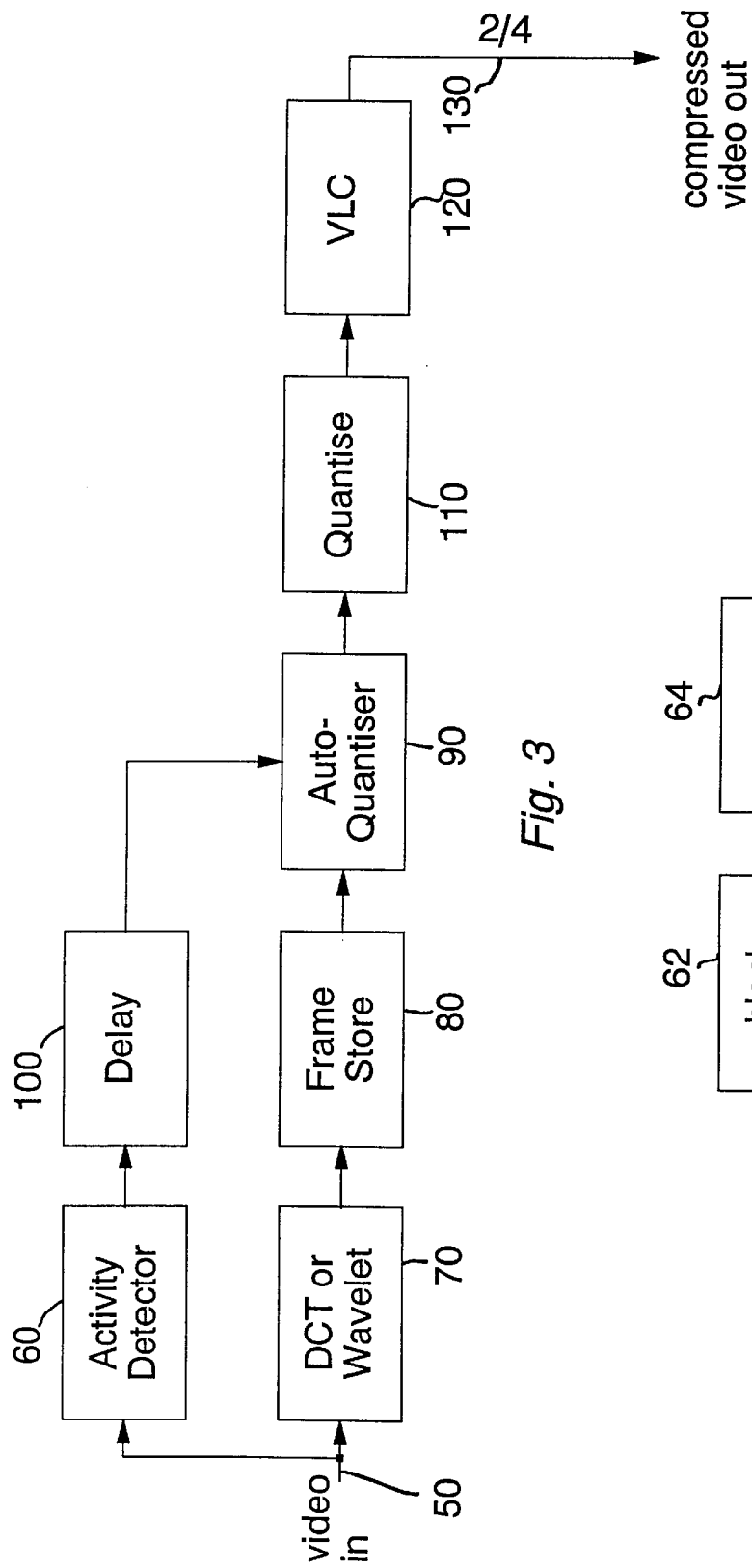
FIG. 3 is a schematic diagram of a video compression apparatus.

FIG. 3 is schematic diagram of a video compression apparatus in which the image activity is measured to vary the degree of data compression applied to blocks or portions of an image.

A digital video signal at an input terminal 50 is passed in parallel to an activity detector 60 and a frequency separator 70, which in this embodiment operates using a discrete cosine transform (DCT), a sub-band technique or a wavelet technique. All of these frequency separation techniques are well documented elsewhere.

The frequency separated data output by the frequency separator 70 is stored in a frame store 80 (which could store data relating to entire pictures or, if sub-areas or slices are being separately processed, the store 80 need only store data relating to such a sub-area), from where it is passed to an auto-quantiser 90. Meanwhile, activity values for each block of the current video picture are detected by the activity detector 60 and are passed by a delay unit 100 (to compensate for the delay period involved in the frequency separation process) to the auto-quantiser 90.

The auto-quantiser 90 will be described in greater detail with reference to FIG. 6 below. Briefly, however, the aim of the auto-quantiser is to select a quantisation scale factor (QSF) for use in subsequent quantisation of the frequency-separated data generated by the frequency separator 70 which is as high as possible (giving the greatest possible number of bits of output data) without exceeding an output target bit rate. The basic idea is that a mid-point quantisation scale factor is used first, and the encoded bit rate generated by a first stage of the auto-quantiser is compared with a desired target bit rate. If the number of encoded bits is too high, the QSF is reduced, and if the number of bits generated is too low, the QSF is increased. By changing the step by which the QSF is adjusted at each stage in the auto-quantiser, the quantisation value can be narrowed down to the most appropriate QSF required for the target bit rate. The generation of quantisation scale factors by the auto-quantiser 90 is modified by the activity values output from the delay 100. This modification process will be described in more detail below with reference to FIG. 6.

The frequency separated image data and associated quantisation scale factors generated by the auto-quantiser 90 are passed to a quantiser 110. The quantised data are then passed to a variable length coder (VLC) such as a Huffman encoder 120 to generate compressed output video at an output terminal 130. The operation of the quantiser and the variable length coder is conventional, except that the quantisation scale factor applied by the quantiser 110 varies for different portions of the image in dependence on the QSF values output by the auto-quantiser 90.

Figure 4:
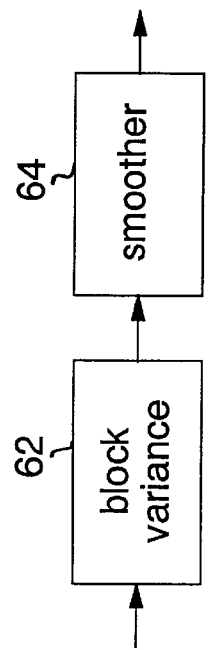
FIG. 4 is a schematic diagram of an activity value detector.

FIG. 4 is a schematic diagram of the activity detector 60, and illustrates a block variance detector 62 followed by a smoother 64. The block variance detector 62 detects the activity value using the formula given above, by dividing the luminance variance for each block by the mean of variances for all of the blocks in that image (or blocks in a current sub-area).

The smoother 64 operates to smooth out sudden changes in activity value of adjacent blocks of the image. This technique is particularly useful where wavelet encoding is used to generate the frequency separated data in the frequency separator 70. Wavelet encoding gives blocks of wavelet coefficients broadly corresponding to the spatial position of blocks of image pixels. However, the nature of the wavelet coding process means that (unlike DCT) the effect of a particular block of wavelet coefficients spreads over surrounding blocks of image pixels when the frequency separator data is subjected to a frequency recombination process. This means that if there are sharp changes between the activity values of adjacent blocks of pixels, and therefore corresponding to changes between the degrees of compression applied to adjacent blocks of wavelet coefficients, there can be visual artifacts generated when the images are decompressed. This can be a particular problem for blocks such as the block 30 which falls at the edge of a region of high image activity (see FIG. 1).

In order to solve this problem, the activity values generated by the block variance detector 62 are filtered by the smoother 64 to smooth out sharp changes between adjacent blocks. Although the filtering could be performed by a conventional two-dimensional multi-tap spatial filter, in the present embodiment a so-called median filter is used.

Figure 5:
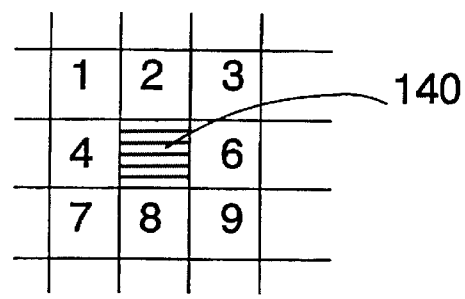
FIG. 5 is a schematic diagram illustrating the smoothing of activity values by the activity value detector of FIG. 4.

The operation of the median filter in the smoother 64 is illustrated schematically in FIG. 5. In this arrangement, the activity values in a 3×3 group of blocks surrounding a particular current block 140 are ranked in ascending order of activity value. The median activity value (in this case, the fifth in the ascending order) is then assigned to the current block. This type of filtering takes considerably less data processing than a conventional multi-tap spatial filter.

Figure 6:
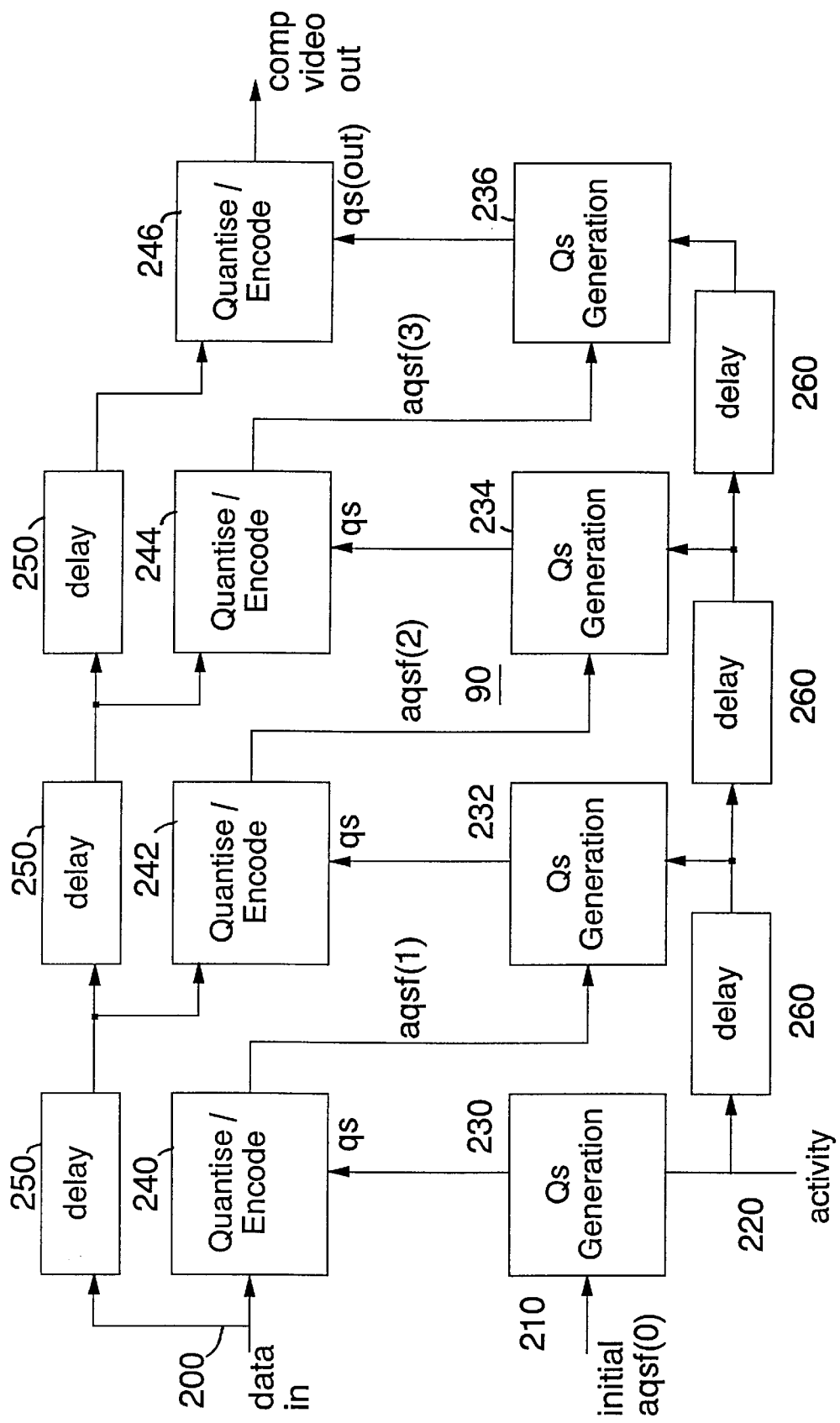
FIG. 6 is a schematic diagram of an auto-quantiser.

FIG. 6 is a schematic diagram of the auto-quantiser 90.

The auto-quantiser 90 receives frequency separated video data from the frame store 80 on an input terminal 200, an initial AQSF value, AQSF(0), on an input terminal 210, and the activity value corresponding to the block containing the current input data on an input terminal 220.

The initial AQSF value, AQSF(0), may be a predetermined or preset number such as 64, or could be generated in response to the properties of the current video data being compressed (this latter case is described below with reference to FIG. 7).

The value AQSF(0) and the activity value for the current block are supplied to a QS generator 230 which generates a current quantising coefficient QS to be supplied to a quantiser/encoder 240. The algorithm used by the QS generator 230 to generate the QS value will be described below.

The quantiser/encoder 240 quantises the current block of video data using the QS value supplied by the QS generator 230 and either performs a full Huffman coding process on the quantised data or simply detects the length of a variable length code which would result from the Huffman coding process (both of these are known techniques). In this way, the quantiser/encoder detects the amount of data which would result from quantising the input frequency separated video data using the QS value generated by the QS generator 230.

The quantiser/encoder 240 also compares its output bit rate using the current QS value with a desired bit rate. If the detected output bit rate is lower than the desired bit rate, then the quantisation scale factor should be increased to apply less harsh quantisation to the frequency separated image data. Conversely, if the detected output bit rate is higher than the desired bit rate, the quantisation scale factor should be reduced. The quantiser/encoder 240 therefore either increases or decreases the initial AQSF value, AQSF(0) by a predetermined proportion such as 50%, and supplies the modified AQSF value, AQSF(1) to a second QS generator 232. Accordingly, if the initial AQSF value is 4, then the value supplied to the QS generator 232, i.e. AQSF(1), will be either 2 or 6. (A higher number of binary search stages could of course be employed to increase the resolution of the qs generation process; the apparatus of FIG. 6 is limited to a small number of stages for clarity of the diagram).

The QS generator 232 operates in a similar manner to the QS generator 230, and provides a quantisation scale factor to control a second quantiser/encoder 242. This also receives the input video data from a delay unit 250. Again, the quantiser/encoder compares its output bit rate with the desired bit rate and either increases or decreases the value of AQSF(1) by 50%, to generate AQSF(2) which is supplied to a third QS generator 234. This process continues with a third quantiser/encoder 244, and a fourth QS generator 236. Each of the QS generators 232, 234 and 236 receives the appropriate activity values by means of delay units 260.

The final quantisation scale factor generated by this process, QS (out) may simply be output to the quantiser 110 of FIG. 3. However, an alternative is illustrated in FIG. 6, where a final quantiser/encoder 246 takes the place of the quantiser 110 and the VLC coder 120 of FIG. 3, to generate the compressed output video.

Each of the QS generators 230, 232, 234 and 236 uses the following formula to relate the quantisation scale factor QS generated by that QS generator to the AQSF value and the activity values:

$$qs = \frac{2 \cdot AQSF}{1 + \frac{A}{P}}$$

where AQSF is a "basic" quantisation value, A is an activity value, and P is a scaling constant.

An important feature of this function is that where the overall quantisation of the image is relatively gentle, then there is a wide variation in quantisation in dependence on the block activity values. However, where the overall quantisation of the image is harsh, then there is little variation between blocks in dependence on their activity values. The reason for the low variation between blocks at a harsh overall quantisation level is that the blocks of high activity are already harshly quantised and so there is little scope for quantising those blocks yet more harshly.

The value of QS(out) generated for the video data changes on a block-by-block basis, since the image activity changes for each block. It is therefore necessary to encode the QS value with each block, for example by embedding it in a block header using techniques known from the MPEG system.

Figure 7:
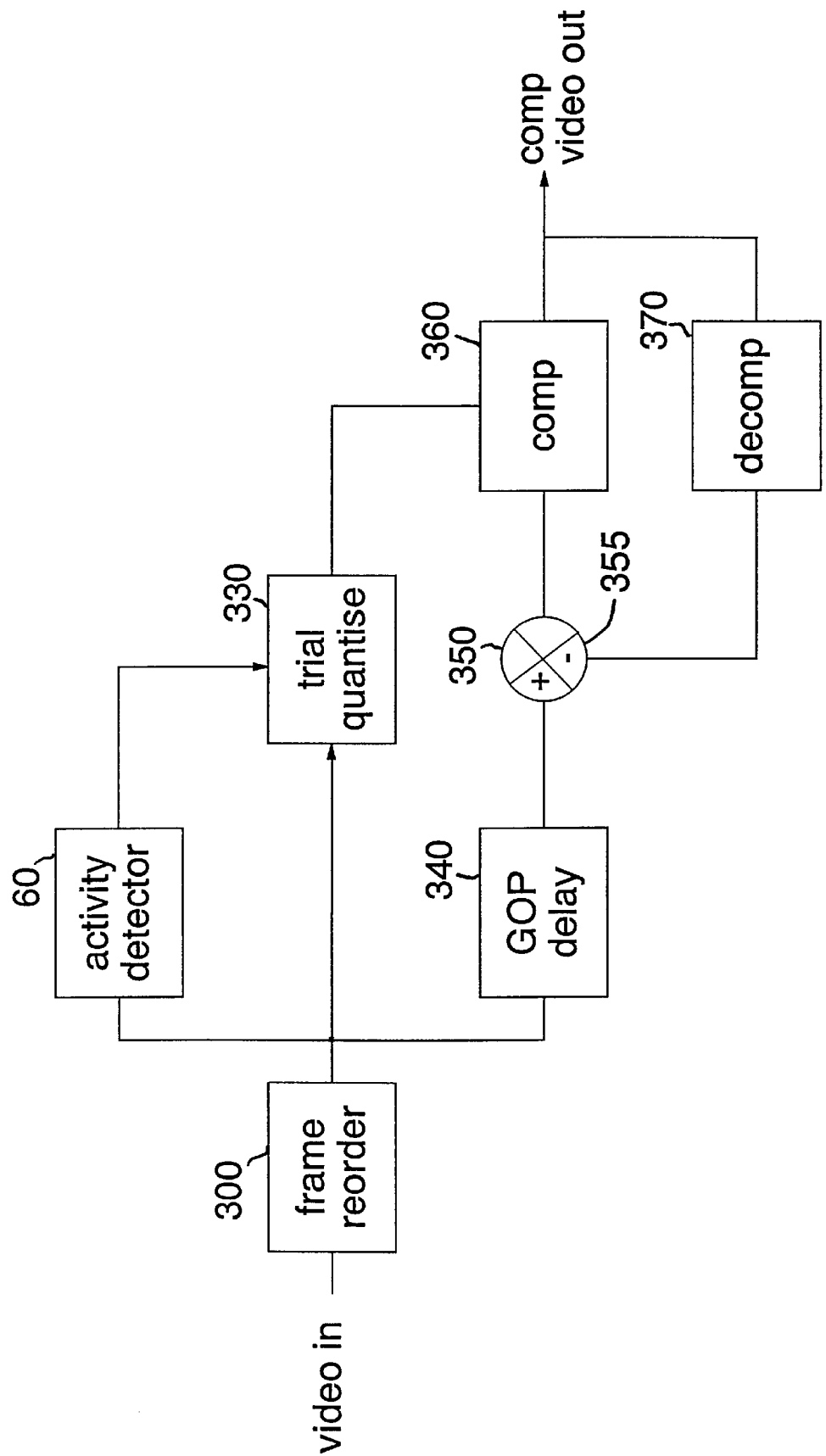
FIG. 7 is a schematic diagram of a second embodiment of a video compression apparatus.

FIG. 7 is a schematic diagram of a second embodiment of a video signal compression apparatus comprising a frame reorderer 10, an activity detector 60, a trial quantiser 330, a GOP delay 340, a subtracter 350, a data compressor 360 and a data decompressor 370.

Many features of the apparatus of FIG. 7 operate in a very similar manner to corresponding features of a so-called MPEG encoder[1]. Such features will not be described in detail here.

[1] Motion Picture Experts Group II standard, described in the ISO/IEC Draft Standard "Coded Representation of Picture, Audio and Multimedia/Hypermedia Information, CD 11172, Dec. 6, 1991, the ISO/IEC Publication DIS 13818/2, "Information Technology—generic coding of motion pictures and associated audio information", March 1995, and many other documents.

Briefly, therefore, the frame reorderer 300 acts on a group of pictures (GOP) to reorder the pictures so that each picture within the GOP is compressed after those pictures on which it depends. For example, if a B-picture (bi-directionally predicted picture) depends on a following I- or P-picture, it is reordered to be compressed after that I- or P-picture.

For example, if a GOP comprises the following four initial frames (in the order in which they are displayed), $I_0B_1B_2P_3$ . . . , where the P-picture uses the I-picture as a reference and the two B-pictures use the surrounding I- and P-pictures as references, then the frame reorderer 10 will reorder the GOP to be compressed in the following order: $I_0P_3B_1B_2$ . . .

The trial quantiser performs a trial compression on at least part of the video data of each GOP, to assess a suitable quantisation factor for use in the final compression of the video data. In doing so, the trial quantiser uses the activity values detected by the activity detector 60 in an auto-quantisation technique similar to that of FIG. 6. The GOP delay 340 is used to allow the trial quantisation and picture selection processes to occur before the final compression process is applied to pictures of a GOP.

The pictures of a GOP are finally compressed by the compressor 360. For an I-picture, the encoding is formed using only intra-picture techniques, so the I-picture is supplied directly from the GOP delay 340 to the compressor 360 (i.e. a zero input is supplied to the subtracting terminal 355 of the subtracter 350). The I-picture is compressed by the compressor 360 using a quantisation factor derived with reference to the trial quantiser 330, and is supplied as a compressed I-picture at the output of the apparatus.

P- and B-pictures are encoded with respect to pictures which have already been encoded by the final compressor 360. In fact, for these pictures, it is the difference between a picture and predicted versions of the one or more pictures on which it depends which are encoded. To achieve this, the picture for encoding is supplied to the subtracter 350 from the GOP delay 340, and predicted versions (i.e. encoded and subsequently decoded by the decompressor 370) of the picture or pictures on which it depends are supplied to the subtracting input 355 of the subtracter 350. The output of the subtracter 350 is therefore a difference signal, which is then compressed by the compressor 360.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for generating quantisation values for use in quantisation of regions of an input image, comprising:

a plurality of non-final stages, each said non-final stage including (i) means for generating a test quantisation value in dependence on a basic quantisation value and an activity value indicative of a degree of detail in a current region; (ii) means for compressing frequency separated image data from said current region in accordance with said test quantisation value; (iii) means for comparing said resulting quantity of compressed data with a desired quantity of data; and (iv) means for adjusting said basic quantisation value to be used by a next stage in dependence on whether said quantity of compressed data is greater than or less than the desired quantity; and a final stage, said final stage being operable to generate a final quantisation value for use in quantising said image data for said current region in dependence on said basic quantisation value and said activity value indicative of a degree of detail in said current region.

2. Apparatus according to claim 1, in which said test quantisation values are generated by the following formula:

$$qs = \frac{2 \cdot AQSF}{1 + \frac{A}{P}}$$

where AQSF is said basic quantisation value, A is an activity value, and P is a scaling constant.

3. Apparatus according to claim 1, in which said activity value for an image region is proportional to said variance of pixel luminance values within that region.

4. Video data compression apparatus comprising:

means for detecting image activity values indicative of image activity for regions of an input image to be compressed;

means for filtering said detected image activity values to reduce the variation in image activity values between groups of adjacent regions of said image; and means for compressing said regions of said image by a degree of data compression dependent on said image activity value for each region, wherein said means for compressing includes a means for frequency separating said regions of said input image to generate respective frequency separated image data, and means for quantising said frequency separated image data derived from each region by a quantisation scale factor dependent on said image activity value for that region;

wherein said frequency separating means is selected from the group consisting of: a wavelet frequency separator, a direct cosine transform frequency separator, and a sub-band frequency separator; and wherein said quantising means includes a multi-stage auto-quantiser for generating quantisation values for use in quantisation of said input image, said multi-stage auto-quantiser being made up of: (A) a plurality of non-final stages, each said non-final stage including (i) means for generating a test quantisation value in dependence on a basic quantisation value and said activity value for a current region; (ii) means for compressing frequency separated image data from said current region in accordance with said test quantisation value;
(iii) means for comparing said resulting quantity of compressed data with a desired quantity of data; and
(iv) means for adjusting said basic quantisation value to be used by a next stage in dependence on whether said quantity of compressed data is greater than or less than the desired quantity; and (B) a final stage which is operable to generate a final quantisation value for use in quantising said image data for said current region in dependence on said basic quantisation value and said activity value for said current region.

5. Apparatus according to claim 4, in which said test quantisation values are generated by the following formula:

$$qs=(2\times AQSF)/(1+A/P)$$

where AQSF is said basic quantisation value, A is an activity value, and P is a scaling constant.

* * * * *